United States Patent
Ruhle et al.

[15] 3,666,958
[45] May 30, 1972

[54] STARTER DRIVE

[72] Inventors: Walter Ruhle, Korntal; Otto Barthruff, Stuttgart, both of Germany

[73] Assignee: Robert Bosch GmbH, Stuttgart, Germany

[22] Filed: Oct. 21, 1970

[21] Appl. No.: 82,608

[30] Foreign Application Priority Data

Nov. 14, 1969  Germany.....................P 19 57 233.9

[52] U.S. Cl................................................................290/48
[51] Int. Cl...........................................................F02n 15/08
[58] Field of Search....................................290/38, 38 A, 48

[56] References Cited

UNITED STATES PATENTS

2,455,328  11/1948  Buxton....................................290/38
2,668,917  2/1954  Uher........................................290/48

Primary Examiner—Bernard A. Gilheany
Assistant Examiner—W. E. Duncanson, Jr.
Attorney—Michael S. Striker

[57] ABSTRACT

A starter drive for combustion engines has a motor on whose rotatable output shaft is mounted a pinion having freedom of rotation as well as axial displacement relative to the shaft. A motion-transmitting arrangement is provided, including a funnel-shaped motion-transmitting element rotatable with the shaft surrounding the same and located adjacent one end of the pinion with its open side facing the latter, and an elastically yieldable annular coupling member surrounding and fast with the pinion at the one end thereof and conically converging on its outer periphery towards the funnel-shaped element so that, when the coupling member is received in the latter, frictional motion-transmission will be established between the shaft and the pinion.

9 Claims, 1 Drawing Figure

Patented May 30, 1972 3,666,958
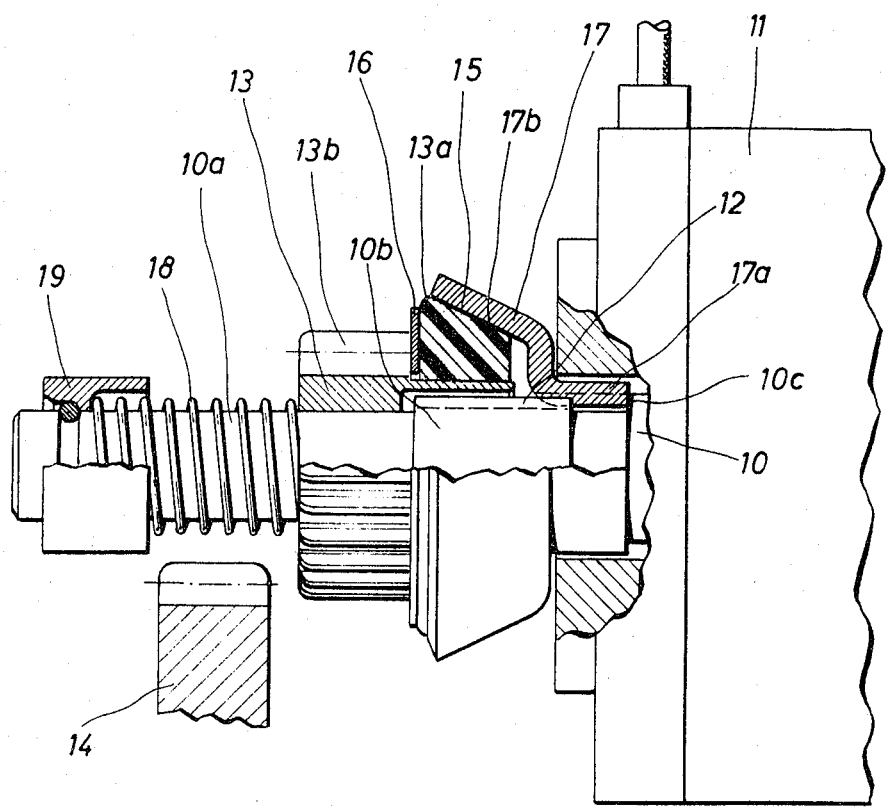
INVENTOR
WALTER RUHLE
OTTO BARTHRUFE
BY
*[signature]*
ATTORNEY

STARTER DRIVE

BACKGROUND OF THE INVENTION

The present invention relates generally to starter drives, and more particularly to starter drives for combustion engines.

Among the various types of starter drives for combustion engines which are known in the art, one known type utilizes an electromotor having a rotatable output shaft on which there is mounted a sleeve shiftable lengthwise of the shaft and surrounded by the drive pinion which in known manner can be brought into mesh with gears for driving the combustion engine which is to be started. The pinion and the sleeves mesh threadedly, and a friction coupling utilizing a rubber ring is provided for transmitting torque to the pinion. In this prior-art construction the rubber ring is compressed axially—when torque is to be transmitted—between one flange which is fast with the output shaft and another flange which is fast with the sleeve. The rubber ring completely fills the space in which it is located after the sleeve has travelled only a short distance to effects its compression, so that the friction coupling in effect becomes rigid when this takes place. This has been found to be disadvantageous, however, especially at the moment when the gear teeth of the pinion first contact the teeth of the gear which they are to drive, that is the gear which in turn is coupled in suitable manner with the combustion engine to be started.

A further known construction utilizes a similar coupling ring which, however, is radially expanded by wedge-shaped members or angular levers located within the confines of the ring, when torque is to be transmitted. This guarantees a gentle meshing of the teeth of the pinion with those of the gear to which motion is to be transmitted, even if the respective teeth first contact one another in end-to-end relationship. However, although this construction overcomes the disadvantage of the one described previously, this second construction requires a relatively complicated and expensive arrangement for effecting the radial expansion of the ring, and this results not only in correspondingly larger space requirements for the finished drive, but also substantially increases the expense involved in producing and selling the same.

It follows, therefore, that what is missing in this field is a starter drive of the type under discussion which affords the advantages but does not possess the disadvantages of the known prior-art constructions.

SUMMARY OF THE INVENTION

It is, accordingly, an object of the present invention to provide a starter drive of the type under discussion which avoids the aforementioned disadvantages and provides the advantages indicated above as desirable.

More particularly it is an object of the present invention to provide such a starter drive which guarantees under all operating conditions a gentle meshing of the teeth of its pinion with those of a gear to which the pinion is to transmit motion.

A concomitant object of the invention is to provide such a starter drive which is simple and comparatively inexpensive in its construction, and therefore will have a correspondingly low selling price.

An additional object of the invention is to provide such a starter drive which is compact and has small space requirements, and which because of its simplicity is highly reliable and not prone to malfunctioning.

In pursuance of the above objects, and others which will become apparent hereafter, one feature of the invention resides in a starter drive for combustion engines which, according to one embodiment, and briefly stated, comprises a a motor having a rotatable output shaft and a pinion on the shaft axially and rotationally displaceable relative thereto. Motion-transmitting means is provided and includes a funnel-shaped motion-transmitting element rotatable with the shaft and surrounding the same adjacent one end of the pinion and having an open side facing the latter, and an elastically yieldable annular coupling member tightly surrounding said one end and conically converging towards the motion-transmitting element so as to be receivable in the latter in frictionally motion-transmitting relationship.

The funnel-shaped motion-transmitting element is threaded onto the shaft, for which purpose it and a cooperating portion of the shaft are provided with meshing steep-pitched threads. The pinion has a hub provided at the aforementioned end with a cylindrical extension on which the annular coupling member is located surrounding the extension. By configurating the annular coupling member of conical or frustoconical shape, and by making the motion-transmitting element of a similar configuration, namely essentially funnel-shaped, it is possible to obtain a continuous increase of the pressure with which the motion-transmitting element engages the coupling member, depending upon the magnitude of the torque to be transmitted, without the elastic property of the coupling member being destroyed. In other words the difficulty of the earlier-mentioned prior-art constructions, where despite the fact that the coupling member is a rubber ring the arrangement once engaged becomes rigid to all intents and purposes, is avoided with the present construction because the elastic properties of the coupling member are retained under all operating conditions. It will be appreciated, of course, that the motion-transmitting element will move axially of the shaft when the motor is energized, under the influence of inertial forces, threading itself along the shaft and engaging the coupling member and pressing against the same for frictional motion-transmitting engagement.

A further advantage of the construction according to the present invention resides in the fact that in arrangements where there is a significant difference between the RPM of the output shaft under no-load conditions and the starting RPM of the combustion engine, the present starter drive will act as a slip coupling between the engaged pinion and the starter motor when the combustion engine has caught and is running under its own power; below the no-load RPM of the starter motor or before deenergization of the starter motor, the drive according to the present invention prevents a disengagement of the pinion from the cooperating gear of the combustion engine so that a reliable turning-over of the combustion engine will always be assured.

The novel features which are considered as characteristic for the invention are set forth in particular in the appended claims. The invention itself, however, both as to its construction and its method of operation together with additional objects and advantages thereof will be best understood from the following description of specific embodiments when read in connection with the accompanying drawing.

BRIEF DESCRIPTION OF THE DRAWING

The single FIGURE illustrates in partially sectioned, partially broken-away fragmentary view an embodiment of the present invention.

DESCRIPTION OF THE PREFERRED EMBODIMENTS

Discussing the drawing in detail it will be seen that reference numeral 11 identifies a starter motor, generally an electrically operated motor, having a rotatable output shaft 10. Such motors are well known and any of the various types conventionally used in starter drives may be employed. The output shaft 10 has a first section 10a with an outer circumferential surface which is smooth, and a second section 10b which is provided with a steep-pitched external thread 12. A pinion 13 is mounted on the section 10a, having freedom of rotation with reference to the shaft 10 as well as freedom of axial displacement relative to the shaft 10, or rather to the section 10a. The pinion 13 has a cylindrical hub 13a and an annulus 13b of gear teeth which is to be brought into meshing engagement with the annulus of gear teeth provided on a gear 14 when the starter drive is to operate for starting a combustion engine. The gear 14 has been shown only fragmentarily, it being evident from the context of the prior art that such a gear will have an outer annulus of gear teeth, and it being further evident that such a gear will be connected in suitable and entirely conventional manner with a non-illustrated combustion engine which is to be turned over as the gear 14 is rotated by the pinion 13.

According to the present invention an annular coupling member 15 of elastically yieldable material, for instance a synthetic plastic material, is mounted on the cylindrical hub 13a of pinion 13; one axial end face of the annular element 15 is supported by the adjacent end faces of the gear teeth of the annulus 13b on the pinion 13. As the drawing clearly shows, the outer circumferential surface of the coupling member 15 converges frusto-conically in direction away from the pinion 13.

The end face of the member 15 which faces the gear teeth of the annulus 13b may abut directly against the latter, but it is preferable—in order to protect the material of the member 15 against damage—to insert a washer 16 between the member 15 and the annulus 13b, such a washer surrounding the hub 13a as illustrated and advantageously having smooth major surfaces.

Whereas the member 15 constitutes a part of the novel motion-transmitting means in the novel starter drive illustrated by way of the exemplary embodiment, a funnel-shaped motion-transmitting element 17 constitutes a cooperating part of the motion-transmitting means. It will be seen that the element 17 surrounds the section 10b of the output shaft 10, and it is to be understood that the inner surface of its hub which surrounds and engages the section 10b is provided with screwthreads which mate with the steep-pitched screwthread 12 on the section 10b. The hub itself is identified with reference numeral 17a and the drawing clearly shows that the conically diverging open side of the element 17 faces towards the pinion 13 and therefore towards the coupling member 15. Because of the cooperating screwthreads on the section 10b and the hub 17a of the element 17, the latter can undergo displacement longitudinally of the shaft section 10b by turning relative to the latter.

A helical expansion spring 18 is provided at that axial end of the pinion 13 which is remote from the element 17; as illustrated, the spring 18 surrounds a portion of the section 10a and bears with one end against the pinion 13 and with the other end against an abutment 19 which is fastened in suitable manner on the section 10a of the shaft 10. The spring 18 therefore tends to continuously urge the pinion 13 towards the right-hand side in the FIGURE, that is it tends to maintain the pinion 13 out of mesh with the teeth of the gear 14. At the same time, it tends to press the outer circumferential surface of the coupling member 15 into contact with the corresponding conically tapered inner circumferential surface 17b of the element 17. A shoulder 10c provided on the shaft 10 and constitutes a terminal abutment for the element 17 when the pinion 13 is in its rest or inoperative position illustrated in the FIGURE.

It is pointed out that the member 15 may be produced as a discrete member and may be secured in suitable manner, as by cooperating projections, by bonding or in any other feasible way, on the hub 13a so as to be rotatable with but not relative to the same. The pinion itself may be of metal, or of other suitable materials. The member 15 may be of rubber or a synthetic plastic. In certain circumstances, for instance if the starter drive is of low-capacity type, for instance if it is required to supply less than 0.2 hp, the pinion 13 and the member 15 may be made for instance by injection molding of synthetic plastic material, and may be of one piece.

The operation of the novel starter drive as illustrated by way of example in the drawing, will be evident from what has been set forth. When the motor 11 is energized with corresponding rotation of the output shaft 10, the inertia of the element 17 causes the same to twist forwardly (towards the left-hand side in the drawing) on the steep-pitch thread 12 and to thereby push the pinion 13 in the same direction against the urging of the spring 18 until the teeth 13b mesh with the teeth of the gear 14. If the teeth of the pinion 13 enter into the spaces between the teeth of the gear 14, then the pinion 13 continues to be displaced forwardly until it abuts against the abutment ring 19. Continued rotation of the shaft 10 causes the element 17 to press more firmly against the member 15, because the pinion 13 has now become stationary with respect to the axial direction of the shaft 10 while the steeply pitched thread 12 continues to permit the element 17 to advance axially towards the pinion 13. This continues until the frictional forces developing as a result between the element 17 and the member 15, and between the member 15 and the pinion 13, have reached a value sufficient to transmit the torque of the shaft 10 via the thread 12, the member 15 and the pinion 13 into the gear 14 of the combustion engine, which thus turns over.

If, on the other hand, the teeth of the pinion do not move into the spaces between the teeth of the gear 14 initially, but instead if the teeth of the pinion 13 first contact and abut against the teeth of the gear 14 in end-to-end relationship, with the meshing engagement of the pinion 13 with the gear 14 being initially prevented, the pressure between element 17 and member 15, and between member 15 and pinion 13 continues to increase until it suffices to turn the pinion 13 with reference to the gear 14 until the teeth of the pinion 13 become aligned with the spaces between the teeth of the gear 14 whereby the pinion 13 is enabled to continue its forward movement into meshing engagement with the gear 14 as before.

When the pinion 13 meshes with the teeth of the gear 14, torque is transmitted through frictional engagement between the element 17 and the member 15, and between the member 15 and the pinion 13. It follows from this that it is actually possible for the member 15 only to tightly surround and engage the hub 13a of the pinion, and not to be non-rotatably connected thereto although this is an additional possibility. In any case, a continuous accommodation of the pressure with which the element 17 engages the member 15 is obtained, depending upon the magnitude of the torque which is to be transmitted. At the same time it is assured, during start-up of the combustion engine which for the time being is coupled with the motor 11, that the pinion 13 will not move out of mesh with the gear 14 until the combustion engine turns over under its own power.

This, however, requires a certain differential between the RPM of the motor 11 under no-load conditions and the RPM at which the combustion engine will rotate under its own power. If, for instance, the combustion engine will turn over momentarily under its own power, load is removed from the motor 11. The engaging pressure between the element 17 and the member 15 drops to a low level so that the element 17 and the member 15 can rotate with reference to one another with the drive acting as a slip coupling. Because of the removal of the load acting upon it, the motor 11 will increase its RPM and consequently restore pressure of the element 17 on the member 15. If, now, the combustion engine does not continue to turn over under its own power, that is if it has done so only briefly as mentioned before but has stopped again, then the transmission of torque in a sense starting the combustion engine continues.

On the other hand, once the combustion engine has started and is running under its own power with its RPM increasing, the starter drive again acts as a slip coupling with the pinion 13 remaining in mesh with the teeth of the gear 14 until such time as the gear 14 reaches a number of revolutions per minute corresponding to the RPM of the motor 11 under no-load conditions, or until such time as the motor 11 is de-energized. When the RPM of the combustion engine and therefore of the gear 14 exceeds the RPM of the output shaft 10 of the motor 11, and only at such time, the element 17 again begins to perform a twisting movement with reference to the shaft section 10b due to the influence of the gear 12, but this time in reverse direction, namely towards the right-hand side in the FIGURE. This permits the spring 18 to displace the pinion towards the right whereby meshing engagement of the pinion 13 with the gear 14 is terminated.

It will be understood that each of the elements described above, or two or more together, may also find a useful application in other types of constructions differing from the types described above.

While the invention has been illustrated and described as embodied in a starter drive for combustion engines, it is not intended to be limited to the details shown, since various modifications and structural changes can be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended

1. A starter drive for combustion engines, comprising an electromotor having a rotatable output shaft; a pinion mounted on said shaft for axial displacement relative thereto from a normal rest position to an operating position, said pinion having at one axial end a portion of reduced diameter; an annular coupling ring of elastically yieldable material mounted on said portion of reduced diameter, and having an outer circumferential surface which conically tapers axially of said pinion in direction from the operating position of said pinion to the rest position thereof; a discrete funnel-shaped motion-transmitting member surrounding said shaft adjacent said one axial end of said pinion and movable relative thereto, and having a divergent open side facing said coupling ring; cooperating steep-pitch threads on said member and said shaft for enabling the former to advance along the latter under the influence of inertial force in response to rotation of said shaft, to thereby contact and initially axially displace said pinion to said operating position with subsequent frictional transmission of motion from said member via said ring to said pinion; and biasing means surrounding said shaft adjacent the other axial end of said pinion and permanently urging said pinion axially of said shaft and into said open side of said motion-transmitting member.

2. A starter drive as defined in claim 1, said pinion having a peripheral annulus of gear teeth, and said coupling ring having an axial end face directed towards said other end and supported by said gear teeth.

3. A starter drive as defined in claim 2; further comprising a washer surrounding said extension intermediate said gear teeth and coupling ring for protecting the latter against damage from the former.

4. A starter drive as defined in claim 1, said coupling ring being unitary with said pinion.

5. A starter drive as defined in claim 1, wherein at least one of said coupling ring and pinion consists of synthetic plastic material.

6. A starter drive as defined in claim 1, wherein said coupling ring and said pinion both consist of synthetic plastic material.

7. A starter drive as defined in claim 1, wherein said coupling ring consists of, and said pinion at least predominantly consists of synthetic plastic material.

8. A starter drive as defined in claim 1, said biasing means comprising a helical spring surrounding said shaft adjacent said other end of said pinion and bearing upon the latter and an abutment, respectively.

9. A starter drive for combustion engines, comprising a motor having a rotatable output shaft; a pinion on said shaft axially and rotationally displaceable relative thereto; and motion-transmitting means, including a funnel-shaped motion-transmitting element rotatable with said shaft surrounding the same adjacent one end of said pinion and having an open side facing the latter and an elastically yieldable annular coupling member surrounding and engaging said one end and conically converging towards said element so as to be receivable in the latter in frictionally motion-transmitting relationship.

* * * * *